United States Patent [19]
Gucker

[11] 3,978,384
[45] Aug. 31, 1976

[54] BIDIRECTIONAL MOTOR DRIVE USING SWITCHED AMPLITUDE CONTROLLED CURRENT

[75] Inventor: George C. Gucker, Old Bethpage, N.Y.

[73] Assignee: Potter Instrument Company, Inc., Plainview, N.Y.

[22] Filed: Apr. 24, 1974

[21] Appl. No.: 463,524

[52] U.S. Cl. ............................. 318/261; 318/280; 318/313; 318/317; 318/678; 318/345
[51] Int. Cl.² ........................................ G05F 1/06
[58] Field of Search ........... 318/678, 380, 280, 256, 318/261, 273, 317, 313, 345 F

[56] References Cited
UNITED STATES PATENTS

| | | | |
|---|---|---|---|
| 3,110,851 | 12/1963 | Plogstedt et al. | 318/294 X |
| 3,260,912 | 7/1966 | Gregory | 318/678 X |
| 3,371,259 | 2/1968 | James et al. | 318/345 |
| 3,590,356 | 6/1971 | Hofmeister | 318/678 X |
| 3,652,913 | 3/1972 | Leland | 318/678 |
| 3,714,534 | 1/1973 | Hoadley | 318/380 X |
| 3,776,111 | 12/1973 | Maida | 318/280 X |
| 3,781,617 | 12/1973 | Thomas | 318/380 |

*Primary Examiner*—B. Dobeck
*Attorney, Agent, or Firm*—Alfred W. Barber

[57] ABSTRACT

In the computer field tape handlers for magnetic tape are widely used. The magnetic tape is moved by a capstan driven by a high power low inertia motor since it is necessary to rapidly accelerate and decelerate the tape in both forward and reverse directions. A high power motor is provided with a command controlled direct current. The motor direction is determined by the selection of one of two pairs of solid state switches. Only one current control circuit is used. Transients are minimized by permitting only one pair of switches to be closed at any time and by switching when the controlled current is at a low value.

9 Claims, 5 Drawing Figures

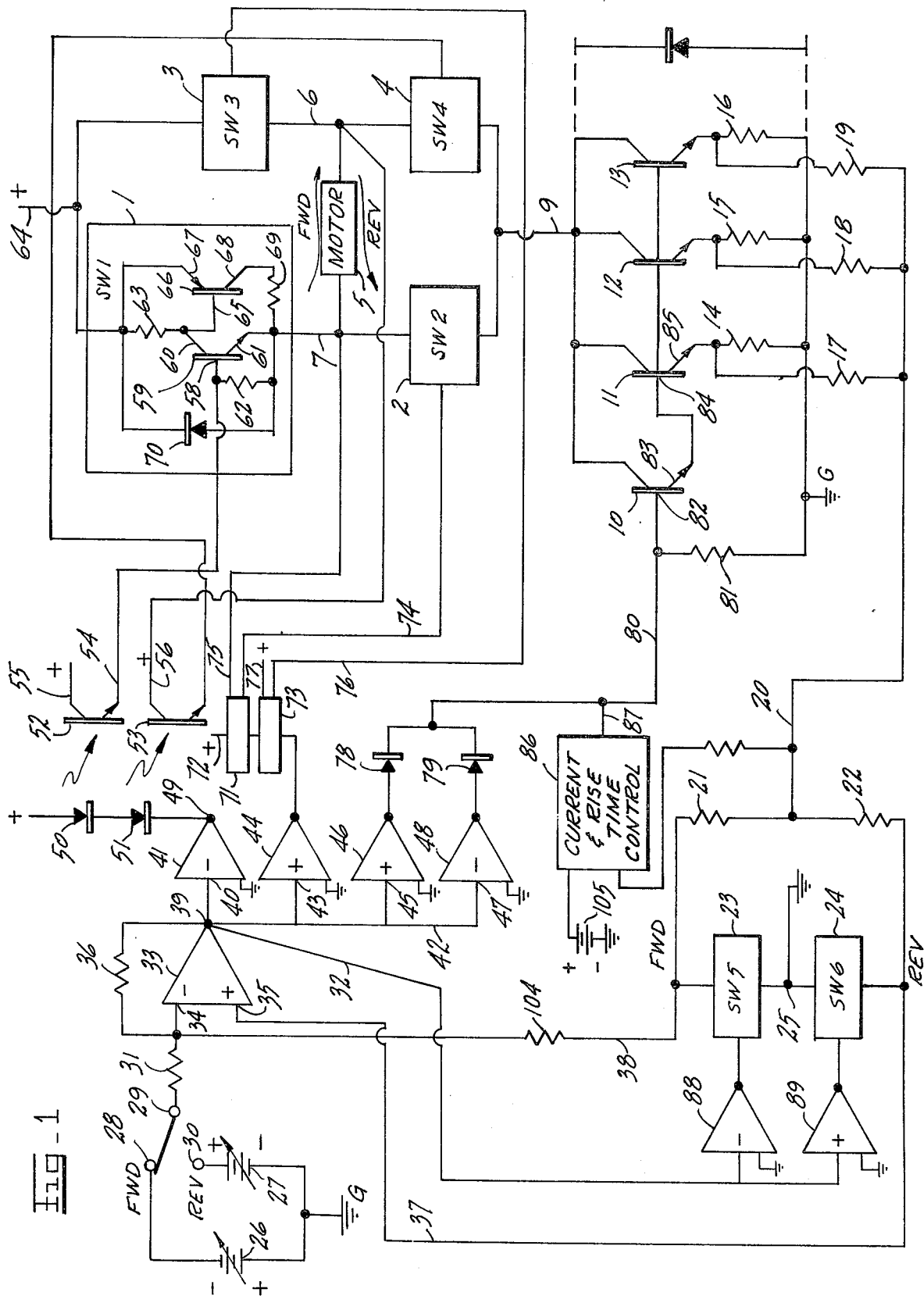

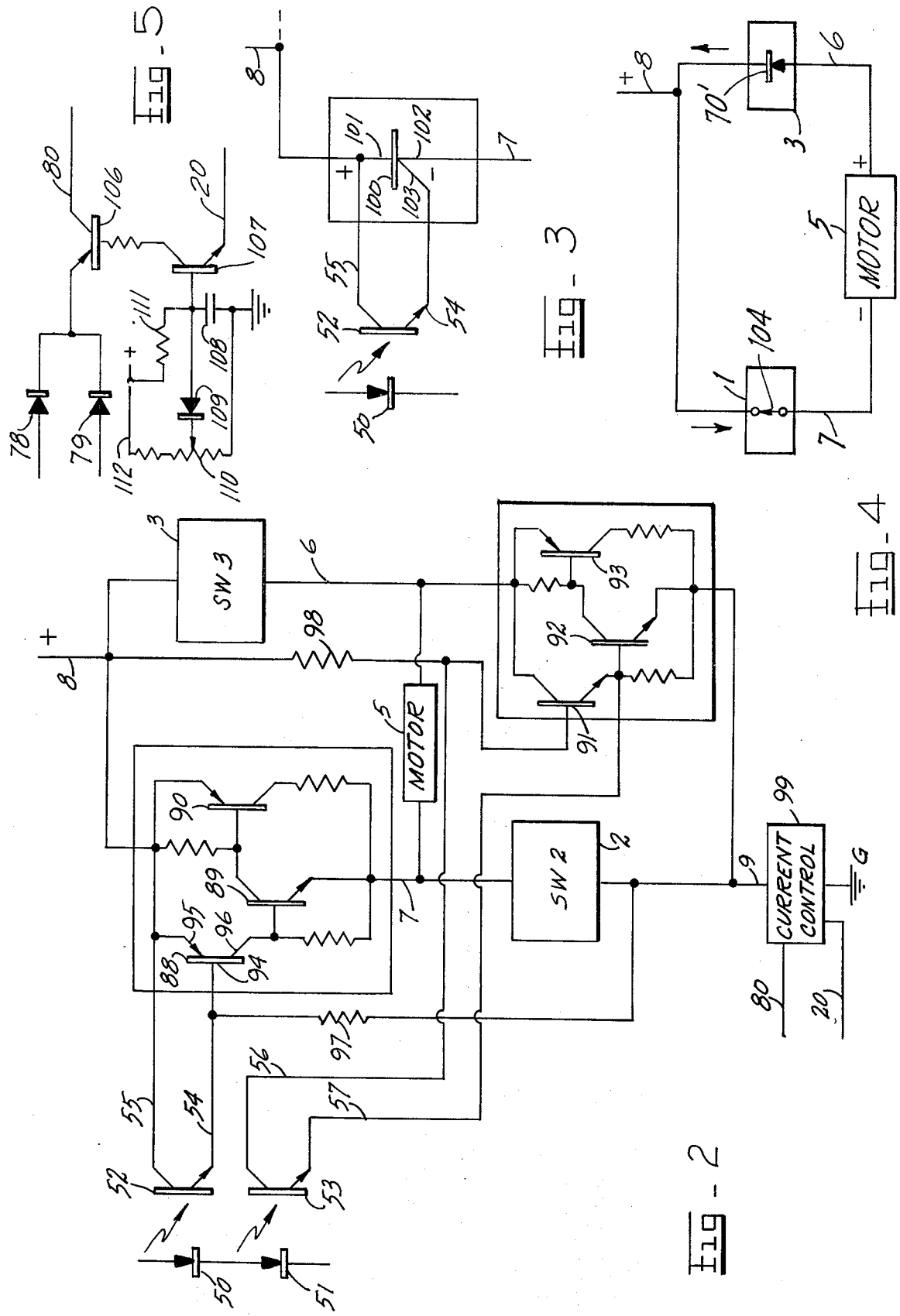

BIDIRECTIONAL MOTOR DRIVE USING SWITCHED AMPLITUDE CONTROLLED CURRENT

Prior Art

At least two prior art circuits, namely, those shown and described in U.S. Pat. Nos. 3,471,073, Brown, and 3,706,020, Klang, are essentially push-pull power amplifiers, One side of the push-pull circuit supplies current in one direction to drive the capstan motor in a forward direction, and the other side supplies current in the other direction to drive the motor in reverse. Each side of the push-pull circuit is controlled by means of a feedback circuit controlling the current fed to the motor. Since each side of a high power push-pull amplifier can be considered an amplifier in itself, these systems, in effect, require two high power amplifiers.

In another prior art circuit, one shown and described in U.S. Pat. No. 3,293,522, Lewis, four amplifiers are used, two for forward drive and two for reverse drive. These are connected in a bridge-like configuration so that the amplifiers switch the motor direction of rotation and control the current supplied to the motor. All four amplifiers are controlled by a feedback circuit.

SUMMARY

In accordance with the present invention, the directional switching function and current control function are separated. The switching function is provided by a circuit particularly adapted to efficient switching and the current control function is provided by a single feedback controlled amplifier. This provides more efficient use of power handling circuits. In addition, in order to simplify the DC coupling problem to the switches, formerly requiring various DC level shifting circuits, optical coupling isolators (OCI) are used, each having an output referenced to the switch to be operated and isolated from all other references.

In the preferred embodiment of the invention, germanium transistors are used for the switches providing a low voltage drop and low dissipation when turned on. It has also been found possible to use a single operational amplifier receiving either forward (FWD) or reverse (REV) commands and to feedback a single polarity signal to control operation in either direction. This is accomplished by switching the feedback signal to one amplifier input for forward control and to the second amplifier input for reverse control in synchronism with switching of the reference command voltage from one polarity to the other.

The Drawing

FIG. 1 is a circuit diagram partly in block form of one form of the present invention.

FIG. 2 is a circuit diagram of a preferred form of switch as used in the present invention.

FIG. 3 shows an SCR switch configuration.

FIG. 4 is a circuit diagram useful in explaining one mode of operation of the switching system.

FIG. 5 is a circuit diagram of one form of current and rise-time control.

FIG. 1 includes the primary motor circuit in which motor 5 is connected in a bridge-like configuration with switches SW1, SW2, SW3, and SW4 connected over lead 64 to a source of positive voltage and over lead 9 to a current control circuit. The motor and switch circuits are completed by means of leads 6 and 7. These switches when selectively closed conduct current through the motor in a predetermined direction. Thus, closing switches 1 and 4 passes current through motor 5 from left to right designated as the forward (FWD) direction. Closing switches 3 and 2 passes current through the motor in the opposite or reversing (REV) direction. Since all switches are similar, details of only one switch, i.e. switch 1 will be shown and described.

The current through the motor, once the direction has been determined by closing teh appropriate switches, is controlled by current control transistors 11, 12, 13, etc., connected between lead 9 and ground or zero reference G. The controlled motor current passes through the current control transistors from collectors to emitters and through emitter series current sensing resistors 14, 15, 16, etc. to ground G. The voltages across current sensing resistors 14, 15, 16, etc. are summed through resistors 17, 18, 19, etc. at lead 20. The voltage on lead 20 being a function of the total motor current provides the feedback signal.

Describing the manner in which this circuit operates, input command voltage as from variable batteries 26 or 27 is applied through switch 28–29–30 and input resistor 31 to the inverting input 34 of operational amplifier 33. Operational amplifier 33 also has a noninverting input 35 and an output terminal 39. A feedback resistor 36 is connected between output terminal 39 and inverting input terminal 34 and which together with input resistor 31 determines the gain of amplifier 33. The output terminal 39 is connected to inverting input 40 of comparator 41 and over lead 42 to noninverting input 43 of comparator 44, noninverting input 45 of amplifier 46, inverting input 47 of amplifier 48 and over lead 32 to the inverting input of amplifier 88 and the noninverting input of amplifier 89. Now, when voltage source 26 is connected to input resistor 31 through the closure of switch 28–29, a negative voltage is applied to inverting input 34 resulting in a positive output voltage at output terminal 39. This positive voltage is inverted by comparator 41 resulting in a negative voltage at output terminal 49 which in turn causes light emitting diodes 50 and 51 to turn on thereby emitting light to phototransistors 52 and 53. When phototransistors 52 and 53 receive this light they become conductive and, in turn, turn on switches SW1 and SW4 which, conducting current in the predetermined forward direction, causes motor 5 to start in the forward direction.

Since switches 1, 2, 3 and 4 use similar circuits only SW1 will be described in detail. The input command over lead 54 is applied to base 58 of driver transistor 59 which, for example, may be a low power silicon transistor. Base 58 is returned through resistor 62 to lead 7 to which emitter 61 is connected directly. Transistor 59 drives resistor 63 and base 65 of power transistor 66 preferably a high current germanium transistor. The base characteristics of transistor 66 together with resistor 63 limit the current through transistor 59. Resistor 69 connected between collector 68 and lead 7 provides a voltage drop supplying collector to emitter voltage for transistor 59 to utilize its high gain characteristics. Resistor 62 decreases the turn off time of transistor 59. The diode 70 prevents the buildup of high transient reverse voltages during the switching operation. Emitter 67 is returned directly to positive voltage lead 64. Thus, there is provided a fast operating switch capable of switching relatively high currents with low voltage drop.

In order to run the motor in reverse (REV), a reverse command is applied to the input of amplifier 33 by closing switch 29–30 thus applying a positive input through input resistor 31 to inverting input 34 and providing a resulting negative output at output terminal 39. This negative output applied over lead 42 to noninverting input 43 of comparator 44 energizes OCI's 71 and 73, similar to the diode 50 transistor 52 combination described above, receiving bias over lead 72, and thereby providing energizing current over leads 74–75 and 76–77 to turn on reversing switches 2 and 3 respectively. Thus has been described the basic directional switching providing forward and reverse direction drive to motor 5.

In addition to the motor directional switching means described above, there is provided means for monitoring, feeding back information and controlling the motor current. The current control transistors 11, 12 and 13 have been described briefly above. These transistors, the actual number being determined by the transistor current handling ability and the current to be controlled, are driven in parallel in a Darlington configuration with transistor 10, i.e. emitter 83 is connected to base 84 and the bases of the other parallel connected power transistors. Base 82, returned to ground G through base resistor 81, is connected over lead 80 to an OR gate formed of diodes 78 and 79. Transistor 10 and hence transistors 11, 12 and 13 are turned on by a positive current through one of diodes 78 and 79 and over lead 80. When a forward command is applied to the input of amplifier 33, since it is a negative voltage, will result in a positive potential at output 39 and on lead 42. This positive potential at non-inverting input 45 of amplifier 46 will provide a positive output through diode 78 and over lead 80 will turn on the current control power transistors for forward operation. For reverse direction operation, a positive potential is applied to the input of amplifier 33 resulting in a negative potential on line 42. This negative potential applied to inverting input 47 of amplifier 48 results in a positive output through diode 79 to line 80 again turning on the current control power transistors, this time for reverse direction operation. Thus, the directional switching and the turning on of the current control power transistors has been described. Next, the means for controlling the motor current will be described.

As was stated above, the motor current is sensed by means of resistors 14, 15 and 16 connected in series with the emitters 85 and so on of current control transistors 11, 12, 13 and so on. The voltages across these current sensing resistors are summed through resistors 17, 18, 19 and so on to provide a current sensing feedback voltage on lead 20. This feedback voltage is applied either through resistor 21 and over lead 38 through resistor 104 to inverting input 34, or through resistor 22 and over lead 37 to noninverting input 35 of amplifier 33. Which path and input is selected depends on the motor directional command. When a forward command is being applied from command voltage source 26 and through input resistor 31 to inverting input 34 and output terminal 39 is positive, the current sensing feedback is supplied over lead 38 and since it is a positive current, it bucks the negative current from command source 26 and inverting input 34 may be looked on as a summing junction. Current in the current control transistors 11, 12 and 13, and hence in the motor 5, rises until the current sensed feedback current nearly equals the forward command current at which point the drive command at output terminal 39 is reduced and relayed over lead 80 preventing further increase in the current drive to the current control transistors. If the feedback current sensed overshoots the commanded current, output 39 goes negative and the routing of feedback current to amplifier 33 changes to that used in reverse drive control.

The reverse drive control operates in a similar manner except that the feedback current sensed voltage through resistor 22 and over lead 37 is applied to noninverting input terminal 35 of amplifier 33. This positive feedback voltage acts in a differential mode with the positive voltage reverse command voltage from command source 27. As in the case of the forward operation, with the exception of the use of the differential input mode, the current in the current control transistors, and hence the motor, builds up increasing the feedback voltage until it approaches the value of the command voltage at which point the output on terminal 39 starts to decrease and, in turn, over lead 80 prevents further increase of current through transistors 11, 12 and 13, and motor 5. If output 39 overshoots to a positive value, the feedback current routing changes to that used for forward drive.

In order to select the feedback path in accordance with the forward or reverse command, switching means is provided for cutting off the unused path. Switches 23 (SW5) and 24 (SW6) are provided for shunting lines 38 and 37 respectively to ground G at junction point 25. While the motor is being operated in the forward direction, switch 24 is closed permitting feedback current to only flow through resistor 21 and over lead 38 through resistor 104 to inverting input 34. While the motor is being operated in the reverse direction, switch 23 is closed permitting feedback voltage to be only applied through resistor 22 and over lead 37 to noninverting input 35 resulting in the control operations described above. These switches may comprise two NPN transistors having emitters connected to the lines, collectors connected to common point 25 and bases connected to the outputs of amplifiers 88 and 89. A positive output will thus close a particular switch. When the system is operating under forward command, a positive voltage at output terminal 39 of amplifier 33 will apply a positive voltage to lead 32 and to the noninverting input of amplifier 89 and hence a positive voltage to close switch 24 cutting off the reverse mode feedback and allowing the forward mode feedback to be effective over lead 38. In a similar manner, when the system is operating under reverse command, a negative voltage at output terminal 39 of amplifier 33 will apply a negative voltage over lead 32 to the inverting input of amplifier 88 and hence a positive voltage to close switch 24 cutting off the forward mode feedback and allowing the reverse mode feedback to be effective over lead 37. Resistor 104 is required so that switch 23 will not short the input from switch pole 39 to the inverting input 34 of amplifier 33.

A current overload prevention and rise-time control circuit may be provided in the form of a clamp circuit 86 connected to lead 80 by means of lead 87 and set to limit the maximum current command on lead 80 by comparing the current sensed feedback voltage on lead 20 with a reference voltage 105.

FIG. 2 is a portion of the system showing a modified switch circuit suitable for use in switches 1, 2, 3 and 4. In this circuit each switch comprises three transistors as 88, 89 and 90 of switch 1 and 91, 92 and 93 of switch 4. The differences here are in the method of coupling the phototransistors to the driver and power transistors 89–90 and 92–93, identical to transistors 59 and 66 shown in FIG. 1 and described above. Between phototransistor 52 and driver transistor 89 is connected transistor 88 with its base 94 connected to the emitter of phototransistor 52 over lead 54; its emitter 95 connected to the positive line 8 and its collector 96 connected to drive the base of driver transistor 89. Base 94 is connected through resistor 97 to negative line 9. Resistor 97 is of such value as to provide turn-on current to base 94 when phototransistor 52 is nonconducting. When phototransistor 52 is conducting, the base 94 of transistor 88 is shorted to emitter 95 and transistor 88 is cut-off and switch 1 is open. This will be seen to be the inverse of the operation of FIG. 1 and hence the photocouplers will be driven in opposite phase i.e. those turned on in FIG. 1 will be turned off in FIG. 2 and vice versa. Switch 4 is similar to switch 1 having a third transistor 91 provided with base current through resistor 98 and shunted to turn off by the conduction of phototransistor 53. The block 99 is intended to represent the current control means provided by transistors 10, 11, 12 and 13 in FIG. 1.

FIG. 3 is a detail of switch 1 using still another switching means, namely a silicon controlled rectifier (SCR). Silicon controlled rectifier 100 is connected with its anode 101 connected to positive line 8, its cathode 102 connected to output line 7 and gate 103 connected to the emitter of phototransistor 52 over lead 54. Phototransistor anode lead 55 is connected to lead 101. This circuit operates in the same mode as the switches of FIG. 1 i.e. the switch turns on in response to conduction of the phototransistor. It is well known that silicon controlled rectifiers turn off only when the current through them drops to zero. Thus, the circuit of FIG. 3 can be used in the present invention only if the motor current is programmed to zero before switching as at the end of a run in a given direction. This program is readily implimented by adding a zero referenced amplitude clamp circuit similar to 86 of FIG. 1 which is allowed to operate prior to reversing the direction switching.

FIG. 4 is a simplified circuit diagram which illustrates a special mode of operation possible with the circuit of FIG. 1. First, assume that the motor is being operated in a direction which corresponds to lead 6 being positive with respect to lead 7. In accordance with the conventions adopted in describing FIG. 1, this would be the reverse or rewind direction. This is accomplished by closing switches 2 and 3. Now, suppose operation in this direction is to be terminated, then switches 2 and 3 are opened. At this moment the back e.m.f. of the motor will maintain lead 6 positive with respect to lead 7. If, while the motor is still running at high speed generating a large back e.m.f., switch 1 is closed as indicated in FIG. 4 as a closed switch 104, a closed circuit will exist through diode 70' (corresponding to diode 70 in switch 1 as shown in FIG. 1) and switch 104 effectively shorting motor 5. Since this current will be high, limited only by the internal impedance of motor 5 and the effective resistances of diode 70' and switch 104, and is in the opposite direction to the just terminated reverse direction current, the motor will be heavily braked. This provides a means for bringing the motor to a sudden stop should the occasion demand such a result. This very high braking current is thus available without calling on the current control circuit (10, 11, 12, 13,) to furnish additional current and is essentially independent of any current control operation.

FIG. 5 is a circuit diagram of one form of current and rise-time control suitable for implementing block 86 of FIG. 1. A series control transistor 106 connected between diodes 78, 79 and line 80 controls the drive to current control transistors 10 – 13 (FIG. 1) and is in turn controlled by transistor 107. When drive to the motor is off, line 20 drops to ground potential and capacitor 108 is discharged through the base to emitter path of transistor 107. When a command is received to start the motor by applying voltage to line 112, capacitor 108 charging through resistor 111 provides a controlled rise-time to the motor current through transistors 107 and 106. Potentiometer 110 and diode 109 clamp to a maximum bias on transistor 107.

While only a few forms of the present invention have been shown and described, it will be apparent to those skilled in the art that modifications and other forms are possible within the spirit and scope of the invention as set forth in the claims.

I claim;

1. In a system for controlling the direction of rotation of and the current through a DC motor, the combination of;
    a four arm bridge in which each arm comprises a signal responsive solid state switch;
    a DC motor to be controlled connected across one diagonal of said bridge;
    a source of DC current connected through signal responsive current control means across the other diagonal of said bridge;
    means for closing a first pair of said switches located in opposite arms of said bridge for energizing said motor in a forward direction;
    means for closing the second pair of said switches for energizing said motor in a reverse direction;
    and feedback responsive means for controlling the current through said motor by means of said signal responsive current control means.

2. In a system for operating a DC motor by means of a controlled DC current, the combination of;
    a DC motor to be controlled;
    means for controlling the current supplied to said motor including current sensing feedback means providing a unipolar feedback voltage which is a function of the current supplied to said motor and including an operational amplifier;
    a source of negative polarity command voltage for controlling the operation of said motor in one direction coupled to said amplifier;
    a source of positive polarity command voltage for controlling the operation of said motor in the other direction coupled to said amplifier;
    and switching means for applying said feedback voltage to one of command voltage sources in summing junction mode and to the other command voltage in differential amplifier mode.

3. A system for controlling a DC motor as set forth in claim 1, wherein;
    said switch closing means include four photocouplers, one of which is connected to actuate each of said switches.

4. A system for controlling a DC motor as set forth in claim 1, wherein;
    said feedback responsive means includes an operational amplifier.

5. A system for controlling a DC motor as set forth in claim 1, wherein;
said solid state switches each includes a germanium power transistor.

6. A system for controlling a DC motor as set forth in claim 1, wherein;
said solid state switches each includes a silicon controlled rectifier.

7. In a system for controlling the direction of rotation and the current through a DC motor, the combination of;
a four arm bridge in which each arm comprises a signal responsive solid state switch,
a DC motor to be controlled connected across one diagonal of said bridge;
a source of DC current connected through signal responsive current control means across the other diagonal of said bridge;
means for generating a directional signal for said switches and a control signal for said current control means including an operational amplifier with an inverting and a noninverting input;
means for applying motor direction of rotation and motor current control signals to one of said inputs;
and means for feeding back a motor current sensed signal to one of said inputs.

8. A system for controlling a DC motor as set forth in claim 1, and including;
means for limiting the maximum current to be provided by said signal responsive current control means.

9. A system for controlling a DC motor as set forth in claim 1, and including;
means for limiting the rise time of current for energizing of said motor.

* * * * *